(12) United States Patent
Duarte

(10) Patent No.: US 7,742,783 B2
(45) Date of Patent: *Jun. 22, 2010

(54) SYMMETRIC SOFTKEYS ON A MOBILE ELECTRONIC DEVICE

(75) Inventor: Matias Duarte, Los Angeles, CA (US)

(73) Assignee: Virgin Mobile USA, L.P., Warren, NJ (US)

( * ) Notice: Subject to any disclaimer, the term of this patent is extended or adjusted under 35 U.S.C. 154(b) by 523 days.

This patent is subject to a terminal disclaimer.

(21) Appl. No.: 11/801,710

(22) Filed: May 10, 2007

(65) Prior Publication Data

US 2008/0280651 A1    Nov. 13, 2008

(51) Int. Cl.
  *H04M 1/02*    (2006.01)
(52) U.S. Cl. .................... 455/550.1; 455/566
(58) Field of Classification Search ................ 455/347, 455/550.1, 556.1, 575.1, 566; 345/156, 158, 345/169, 172
  See application file for complete search history.

(56) References Cited

U.S. PATENT DOCUMENTS

| | | | |
|---|---|---|---|
| 5,825,675 A | 10/1998 | Want et al. | |
| 6,463,304 B2 * | 10/2002 | Smethers | 455/566 |
| 6,538,636 B1 | 3/2003 | Harrison | |
| 7,085,590 B2 * | 8/2006 | Kennedy et al. | 455/556.1 |
| 7,181,251 B2 * | 2/2007 | Stohr et al. | 455/566 |
| 7,289,102 B2 | 10/2007 | Hinckley et al. | |
| 7,353,069 B2 * | 4/2008 | Tsai | 700/17 |
| 2002/0033836 A1 * | 3/2002 | Smith | 345/649 |
| 2004/0201595 A1 | 10/2004 | Manchester | |
| 2005/0044510 A1 | 2/2005 | Yi | |
| 2005/0068292 A1 | 3/2005 | Duarte et al. | |
| 2005/0068337 A1 | 3/2005 | Duarte et al. | |
| 2005/0090288 A1 | 4/2005 | Stohr et al. | 455/566 |
| 2006/0176278 A1 | 8/2006 | Mathews et al. | |
| 2006/0215011 A1 * | 9/2006 | P. S. et al. | 348/14.02 |
| 2007/0004451 A1 | 1/2007 | Anderson | |
| 2007/0042707 A1 | 2/2007 | Better et al. | |
| 2007/0111750 A1 | 5/2007 | Stohr et al. | |
| 2007/0178891 A1 | 8/2007 | Louch et al. | |
| 2008/0214250 A1 * | 9/2008 | Chauhan et al. | 455/575.1 |

OTHER PUBLICATIONS

International Search Report from the International Searching Authority for International Application No. PCT/US2007/019264, mailed Apr. 14, 2008, 6 pages.
Written Opinion of the International Searching Authority for International Application No. PCT/US2007/019264, mailed Apr. 14, 2008, 8 pages.
United States Office Action, U.S. Appl. No. 11/519,268, mailed Jun. 9, 2009, 10 pages.
United States Office Action, U.S. Appl. No. 11/519,268, mailed Dec. 15, 2009, 13 pages.

* cited by examiner

*Primary Examiner*—Blane J Jackson
(74) *Attorney, Agent, or Firm*—Fenwick & West LLP

(57) ABSTRACT

A mobile electronic device is provided having a display with a display centerpoint; a first softkey and a second softkey, each substantially equidistant from the display centerpoint; and a third softkey and a fourth softkey, each substantially equidistant from the display centerpoint, wherein the first softkey and the third softkey are positioned on opposite sides of the display and on a first axis that passes through the display centerpoint, and wherein the second softkey and the fourth softkey are positioned on opposite sides of the display and on a second axis that passes through the display centerpoint.

12 Claims, 3 Drawing Sheets

SYMMETRIC SOFTKEYS ON A MOBILE ELECTRONIC DEVICE

FIELD OF THE INVENTION

The present invention relates generally to mobile user interface design and, more particularly, to a mobile device having softkeys arranged symmetrically to support both portrait and landscape use.

BACKGROUND OF THE INVENTION

Designing a mobile device to serve as a both phone and a keyboard device can present a number of usability issues. For example, if the phone is to be used on one orientation and the keyboard in another, softkeys positioned for use with the phone may be awkward to access when the keyboard is in use.

SUMMARY OF THE INVENTION

Embodiments of the present invention provide a system for simplifying user operation of a mobile device in multiple orientations. In more specific terms, certain embodiments may be used to configure a mobile device to position softkeys in a way that supports operation of the device in both portrait and landscape orientations.

In one embodiment of the present invention, a mobile electronic device is provided having a display with a display centerpoint, a first softkey and a second softkey, each substantially equidistant from the display centerpoint; and a third softkey and a fourth softkey, each substantially equidistant from the display centerpoint, wherein the first softkey and the third softkey are positioned on opposite sides of the display and on a first axis that passes through the display centerpoint, and wherein the second softkey and the fourth softkey are positioned on opposite sides of the display and on a second axis that passes through the display centerpoint.

In another embodiment, a mobile electronic device is provided that includes a processor; an orientation sensor, operably coupled to the processor, for detecting an orientation of the mobile electronic device; and a softkey, operably coupled to the processor, configured to display a visual stimulus in response to a change in the orientation of the mobile electronic device.

In another embodiment, a method includes emphasizing a softkey on a mobile electronic device by activating a visual stimulus; and changing the visual stimulus in response to a change in an orientation of the mobile electronic device.

BRIEF DESCRIPTION OF THE DRAWINGS

These embodiments and other aspects of this invention will be readily apparent from the detailed description below and the appended drawings, which are meant to illustrate and not to limit the invention, and in which.

DETAILED DESCRIPTION OF THE PREFERRED EMBODIMENTS

The present invention will be more completely understood through the following detailed description, which should be read in conjunction with the attached drawings. In this description, like numbers refer to similar elements within various embodiments of the present invention. Within this detailed description, the claimed invention will be explained with respect to preferred embodiments. However, the skilled artisan will readily appreciate that the methods and systems described herein are merely exemplary and that variations can be made without departing from the spirit and scope of the invention.

Embodiments of the present invention relate to a mobile device with softkeys (i.e., software keys) configured to facilitate use of the mobile device held in various orientations. In some embodiments, the softkeys are positioned adjacent to the display of a mobile device in an symmetric fashion to accommodate, for example, portrait or landscape use. Other embodiments are configured so that the corresponding softkey labels can be redrawn when the orientation of the device is changed.

In the following discussion of illustrative embodiments, the "mobile device" includes, without limitation, mobile phones, personal digital assistants, hand-held computers, ultra-mobile personal computers, and the like. The term "softkey" includes, without limitation, a hard key without a fixed function, or alternatively, a virtual or screen button that appears on a touch screen. In either configuration, softkeys may be programmed to perform dynamic functions. The term "user" refers to an individual using a mobile device. The terms "portrait" and "landscape" refer to the orientation of the mobile device with respect to the user.

Figure 1:
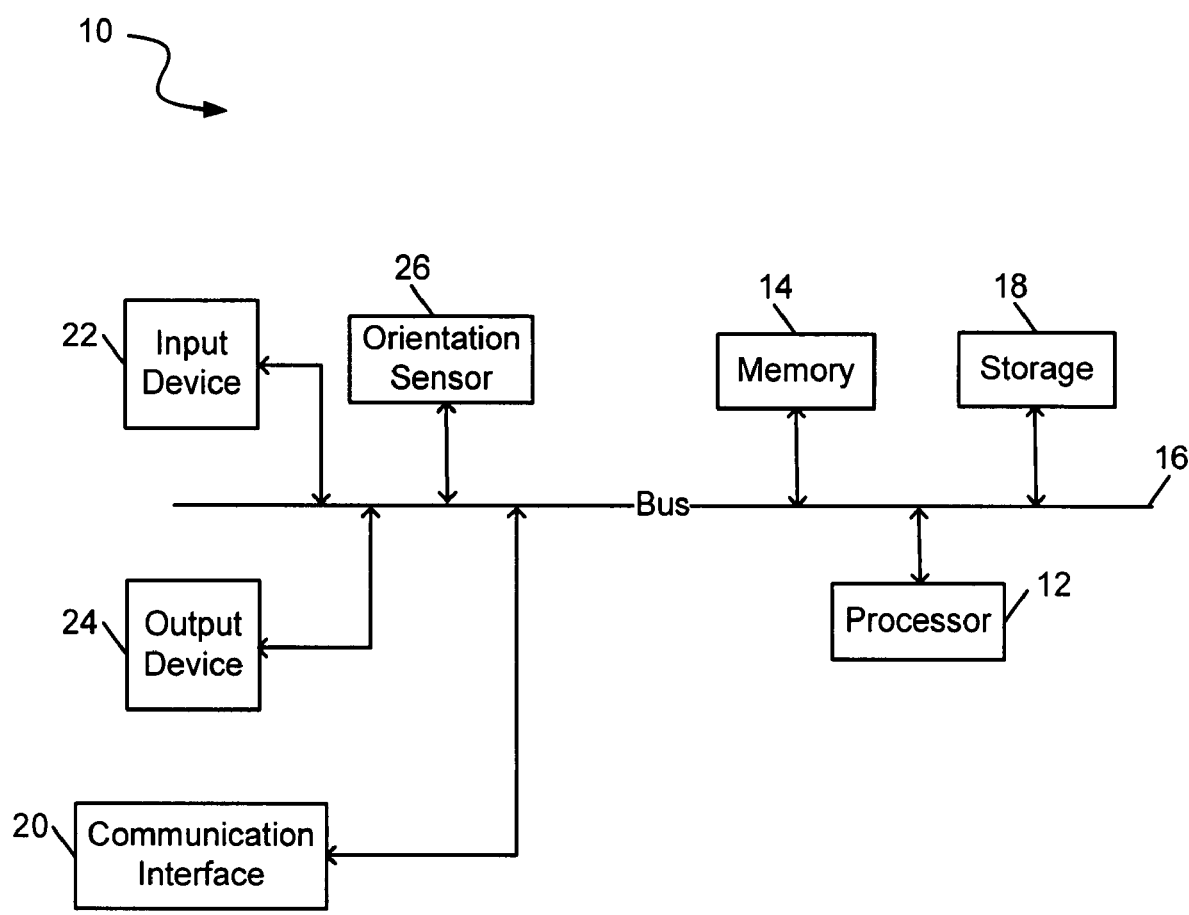
FIG. 1 is a functional block diagram that illustrates the components of an exemplary system for practicing an embodiment of the present invention.

FIG. 1 is a functional block diagram that illustrates the components of an exemplary mobile device 10 for practicing an embodiment of the present invention. As illustrated, mobile device 10 includes a processing unit 12, a system memory 14, a disk storage 18, a communication interface 20, an input device 22, an output device 24, an orientation sensor and a system bus 16. System bus 16 couples system components including, but not limited to, system memory 14 to processing unit 12. The processing unit 12 can be any of various available processors.

Input device 22 may be a keyboard, thumbboard, or touchscreen (for use with a stylus) that are used to receive data from a user. Output device 24 may be a display device, such as an LCD or LED display screen. Those skilled in the art will appreciate that a graphical user interface may be implemented with touchscreen technology in which the functions of output device 24 and input device 22 may be combined. Those skilled in the art will also appreciate that mobile device 10 can include various screen dimension ratios as well as size without departing from the principles of the invention.

Storage 18 may include removable or fixed, volatile or non-volatile or permanent or re-writable computer storage media. The computer readable medium can be any available medium that can be accessed by a general purpose or special purpose mobile device. By way of example, and not limitation, such a computer readable medium can comprise flash memory, RAM, ROM, electrically erasable programmable read only memory (EEPROM), optical disk storage, magnetic disk storage or other magnetic storage devices, or any other medium that can be used to store digital information on a mobile device.

It is to be appreciated that FIG. 1 describes software that acts as an intermediary between users and the basic resources described in mobile device 10. Such software preferably includes an operating system. The operating system, which can be resident in storage 18, acts to control and allocate resources of mobile device 10. System applications take advantage of the management of resources by the operating system through program modules and program data stored either in system memory 14 or on disk storage 18. Furthermore, it is to be appreciated that the present invention can be implemented with various operating systems or combinations of operating systems.

The computer readable medium tangibly embodies a program, functions, and/or instructions that cause the computer system to operate in a specific and predefined manner as described herein. Those skilled in the art will appreciate, however, that the modules described below, such as a software module suitable for remapping softkey labels in response to a change in the device orientation, may be implemented at any level, ranging from hardware to application software and in any appropriate physical location. For example, the present invention may be implemented as software code to be executed by mobile device 10 using any suitable computer language and may be stored on any of the storage media described above, or can be configured into the logic of mobile device 10. Such software code may be executed by mobile device 10 using any suitable computer language such as, for example, Java, Javascript, C++, C, C#, Perl, Visual Basic, Transact/Structure Query Language (T/SQL), database languages, APIs, various system-level SDKs, assembly, firmware, microcode, and/or other languages and tools.

These are representative components of a mobile device whose operation is well understood. Furthermore, those of ordinary skill in the art will appreciate that mobile device 10 of FIG. 1 is exemplary only and that the present invention can operate within a number of different mobile devices including network-enabled wireless mobile phones, personal digital assistants (PDA) and so forth.

Figure 2:
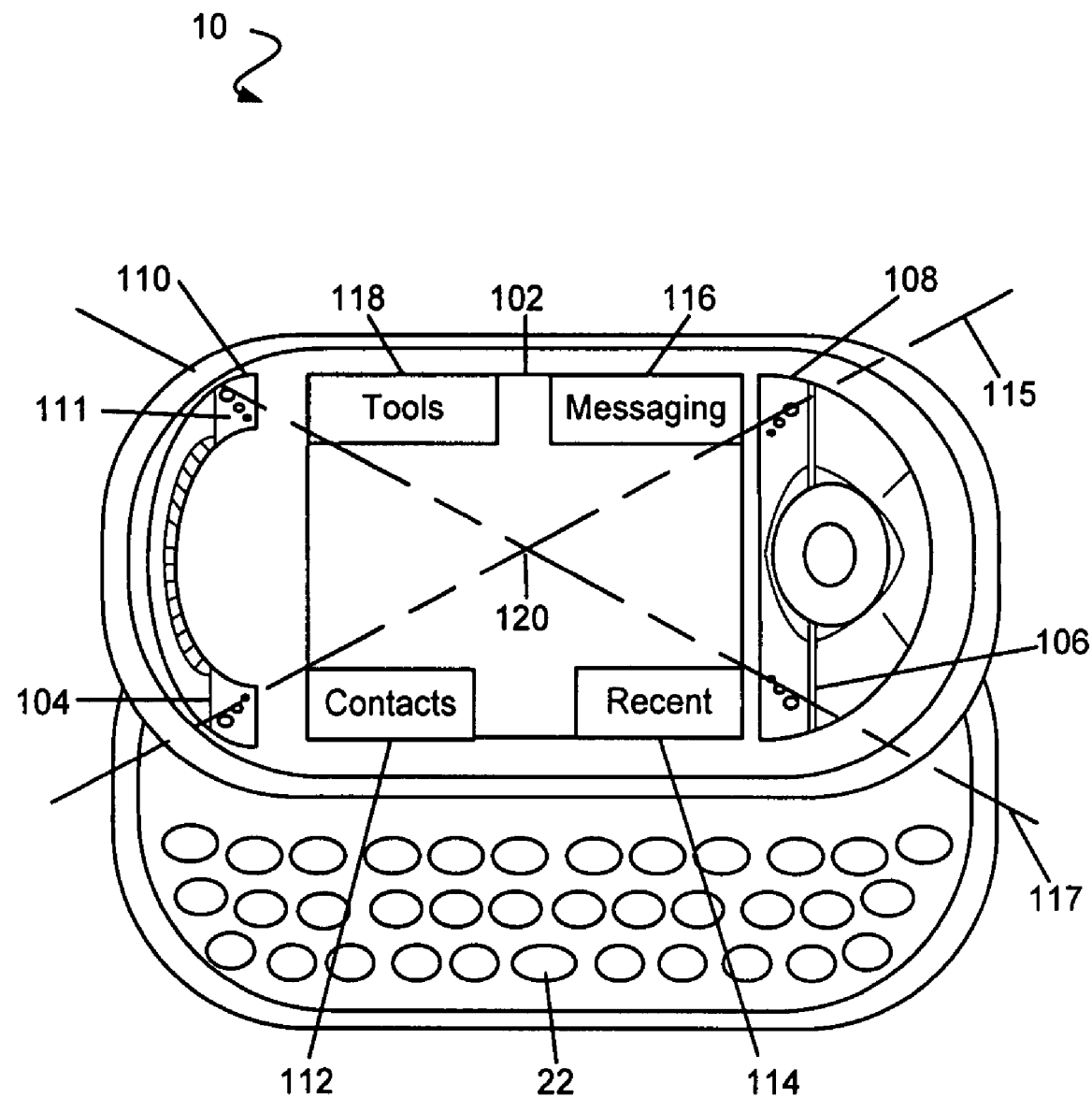
FIG. 2 is a schematic diagram of a mobile device in a landscape orientation and an open configuration according to an embodiment of the present invention.

FIG. 2 is a schematic diagram that illustrates a mobile device 10 in a landscape orientation according to an embodiment of the present invention. As illustrated, mobile device 10 includes a miniaturized QWERTY style keyboard 22 and a display screen 102 with adjacent softkeys 104, 106, 108, and 110. Mobile device 10 further includes softkey labels 112, 114, 116, and 118 drawn on display screen 102 and adjacent to respective softkeys 104, 106, 108, and 110, so that the function and action associated with each softkey may be readily defined and re-defined according to the particular state of the user interface. When pressed or otherwise activated, softkey 104, for example, causes mobile device 10 to carry out a particular function associated softkey label 112. In the illustrated embodiment, mobile device 10 displays exemplary softkey labels 112, 114, 116, and 118 as "contacts," "recent," "messaging," and "tools," respectively.

In an embodiment, softkey 104 and softkey 108 are positioned along an axis 115 that passes through a centerpoint 120 of display 102. Likewise, softkey 106 and softkey 110 are positioned along an axis 117 that also passes through centerpoint 120. By arranging pairs of keys along an axis that passes through centerpoint 120, a user of mobile device 10 can readily access softkeys positioned near the corners of display 102 in any orientation. In some embodiments, positioning softkeys near the lower corners of display 102 may optimize use of the device with the thumbs. According to another embodiment, softkey 106 and softkey 108 may be combined into a single rocker key but with separate activation points at each end.

In the illustrated embodiment, softkeys 104, 106, 108, and 110 include a label 111 printed thereon having a conical design whereby the narrow end is positioned closer to the display than the wide end. Label 111 may be any two dimensional design, such as one configured to direct the user's attention to the display.

According to an embodiment, one or more of softkeys 104, 106, 108, and 110 may include visual indicators that selectively turn on based on the orientation of mobile device 10. For example, for the orientation shown in FIG. 2, softkeys 104 and 106 may be configured to illuminate while softkeys 108 and 110 would not be illuminated. Similarly, for the orientation shown in FIG. 3, softkeys 106 and 108 would be illuminated while softkeys 104 and 100 would not be illuminated. Selective illumination of softkeys may be useful to emphasize softkeys that have significance in a certain orientation. Those skilled in the art will appreciate that many type of visual indicators are possible including, for example, a change in light intensity (e.g., dimming one or more lights while intensifying others), a change in light color (e.g., blue lights below the display with green lights above), a change in light location (e.g., turning off one light and turning on others), or a change in blinking pattern.

Figure 3:
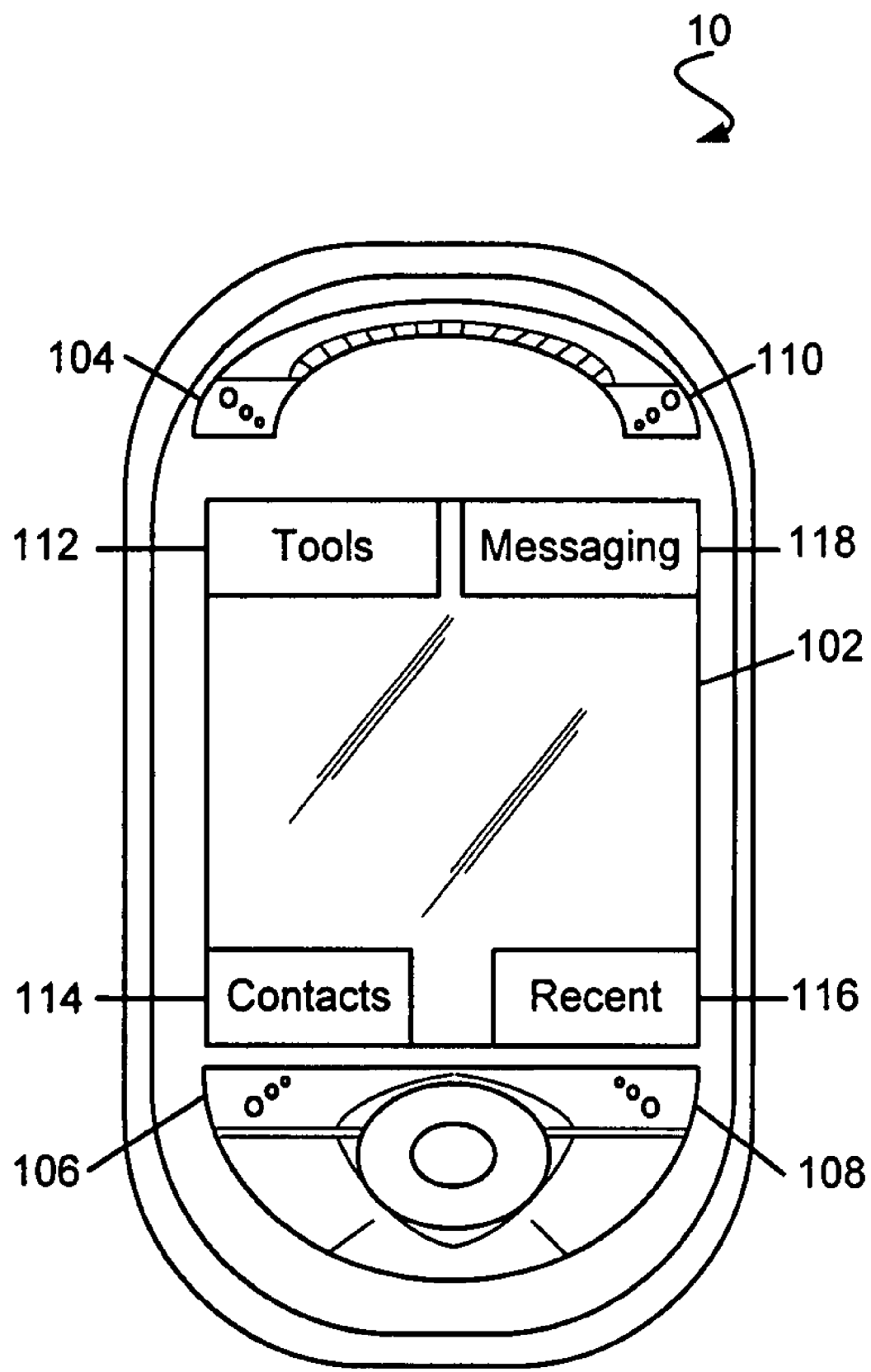
FIG. 3 is a schematic diagram of a mobile device in a portrait orientation and a closed configuration according to an embodiment of the present invention.

FIG. 3 is a schematic diagram of mobile device 10 in a portrait orientation and with keyboard 22 in a closed position. If the user rotates mobile device 10 clockwise from a landscape orientation, shown in FIG. 2, into a portrait orientation, shown in FIG. 3, mobile device 10 may be configured to redraw (automatically or semi-automatically) one or more of the softkey labels so that the function of the softkey label remains in the same location with respect to the user. For example, in a landscape orientation, softkey label 112 appears in the lower left hand corner of display 102 and indicates "contacts" as the function associated with softkey 104. In a portrait orientation shown in FIG. 3, the "contacts" function may be remapped from softkey label 112 to softkey label 114 so that this function is associated with softkey 106.

The illustrated embodiments offer many advantages in terms of usability. For example, embodiments of the present invention include softkeys below display 102, in multiple orientations, which allows users of mobile device 10 to access the associated softkey functions without obstructing display 102.

Variations, modification, and other implementations of what is described herein will occur to those of ordinary skill in the art without departing from the spirit and scope of the invention as claimed. Accordingly, the invention, is to be defined not by the preceding illustrative description but instead by the spirit and scope of the following claims.

The invention claimed is:

1. A mobile electronic device comprising:
   an orientation sensor for detecting an orientation of the mobile electronic device;
   a display screen;
   a plurality of softkeys physically disposed on the mobile electronic device adjacent to the display screen, wherein each of the plurality of softkeys has a position relative to the display screen in a first orientation of the mobile electronic device that corresponds to a position relative to the display screen of a different softkey in a second orientation of the mobile electronic device; and
   a processor coupled to the orientation sensor and configured to redefine the plurality of softkeys responsive to an indication from the orientation sensor that the mobile electronic device has been moved from the first orientation to the second orientation, wherein the plurality of softkeys are redefined so that each softkey in the second orientation has the same function as the different softkey in the same position in the first orientation.

2. The mobile electronic device of claim 1 wherein the display includes a first corner and a second corner adjacent to the first corner, and wherein the first softkey is positioned at a distance near the first corner and the second softkey is positioned near the second corner.

3. The mobile electronic device of claim 2 wherein the distance near the first corner is approximately equal to 25 percent of a distance between the first corner and the second corner.

4. The mobile electronic device of claim 2 wherein the first corner includes a rounded corner.

5. The mobile electronic device of claim 1 further comprising,
a processor operably coupled to the display;
a first softkey label displayed by the processor on the display at a location defined with respect to the user, wherein the first softkey label is associated with a function; and
an orientation sensor, operably coupled to the processor, for detecting the orientation of the mobile electronic device, wherein the processor is configured to change the orientation of the first softkey label in response to a change in the orientation of the mobile electronic device.

6. The mobile electronic device of claim 5 further comprising,
a label remapping module configured to redraw the first softkey label if the orientation of the mobile device changes so that the function remains in the location.

7. The mobile electronic device of claim 1 further comprising,
a processor operably coupled to the display;
a first softkey label displayed by the processor on the display; and
means for detecting the orientation of the mobile electronic device and changing the orientation of the first softkey label in response to a change in the orientation of the mobile electronic device.

8. The mobile electronic device of claim 1 wherein the first softkey includes a first label printed thereon, and wherein the first label includes a wide end and a narrow end, and wherein the narrow end is closer to the display centerpoint than the wide end.

9. The mobile electronic device of claim 1 wherein the first softkey and the second softkey are combined into a single rocker key.

10. The mobile electronic device of claim 1 wherein the display is square.

11. The method of claim 1, further comprising
emphasizing one or more of the softkeys on the mobile electronic device by activating a visual stimulus within the softkey; and
changing the visual stimulus in response to a change in an orientation of the mobile electronic device.

12. The method recited in claim 11 wherein the visual stimulus is from the group comprising activation of light, a change in light intensity, a change in light color, and a change in a light blinking pattern.

* * * * *